United States Patent
Wang et al.

(10) Patent No.: US 12,224,986 B2
(45) Date of Patent: Feb. 11, 2025

(54) SYSTEM AND METHOD FOR FIREWALL POLICY RULE MANAGEMENT

(71) Applicant: Morgan Stanley Services Group Inc., New York, NY (US)

(72) Inventors: Hongliang Wang, Singapore (SG); Jack Suzuki, Tokyo (JP); Jun Wu, Shanghai (CN); Rongfeng Zhou, Singapore (SG)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/461,417

(22) Filed: Sep. 5, 2023

(65) Prior Publication Data

US 2025/0007883 A1    Jan. 2, 2025

Related U.S. Application Data

(63) Continuation of application No. 18/344,274, filed on Jun. 29, 2023, now abandoned.

(51) Int. Cl.
*H04L 29/06*       (2006.01)
*H04L 9/40*        (2022.01)

(52) U.S. Cl.
CPC ...... *H04L 63/0263* (2013.01); *H04L 63/0236* (2013.01)

(58) Field of Classification Search
CPC .............. H04L 63/0263; H04L 63/0236
See application file for complete search history.

(56) References Cited

U.S. PATENT DOCUMENTS

| | | | |
|---|---|---|---|
| 6,460,141 B1 | 10/2002 | Olden | |
| 6,834,301 B1* | 12/2004 | Hanchett | H04L 41/0873 709/224 |
| 7,991,899 B2 | 8/2011 | Schmidt | |
| 8,904,511 B1* | 12/2014 | O'Neill | H04L 63/0263 709/228 |
| 10,157,290 B1* | 12/2018 | Sinha | H04L 63/1408 |
| 11,570,148 B2 | 1/2023 | Liu et al. | |
| 2003/0021283 A1 | 1/2003 | See et al. | |
| 2003/0177389 A1* | 9/2003 | Albert | H04L 63/20 726/1 |

(Continued)

OTHER PUBLICATIONS

Office Action for U.S. Appl. No. 18/776,556, filed Sep. 12, 2024.

(Continued)

*Primary Examiner* — Vance M Little
(74) *Attorney, Agent, or Firm* — PEARL COHEN ZEDEK LATZER BARATZ LLP

(57) ABSTRACT

A system and method may update network policies by determining, among a set of hosts, a subset of hosts to have network policies updated; for each host in the subset of hosts, determining a set of policies relevant to the host; and for each of the subset of hosts, installing the set of policies relevant to the host. The subset of hosts may be determined based on a category or division such as the time zone corresponding to the location of each host in the subset of hosts. The policies relevant to the host may be received from a database and saved to a file with the set of policies relevant to the host; the host may then access the file.

13 Claims, 3 Drawing Sheets

(56) References Cited

U.S. PATENT DOCUMENTS

| | | | |
|---|---|---|---|
| 2005/0177829 A1* | 8/2005 | Vishwanath | G06F 8/61 |
| | | | 717/177 |
| 2007/0271592 A1 | 11/2007 | Noda | |
| 2008/0104661 A1* | 5/2008 | Levin | G06F 21/6218 |
| | | | 726/1 |
| 2009/0288135 A1 | 11/2009 | Chang et al. | |
| 2013/0227109 A1* | 8/2013 | Crudele | H04L 41/0893 |
| | | | 709/223 |
| 2015/0324589 A1* | 11/2015 | Thanos | H04L 63/102 |
| | | | 726/1 |
| 2018/0027006 A1 | 1/2018 | Zimmermann et al. | |
| 2018/0343236 A1* | 11/2018 | Pillay-Esnault | H04L 63/20 |
| 2020/0177548 A1 | 6/2020 | Devarajan et al. | |
| 2020/0296007 A1 | 9/2020 | Finn, II et al. | |
| 2020/0336513 A1* | 10/2020 | Martin | H04L 63/0263 |
| 2020/0374268 A1 | 11/2020 | Wyatt et al. | |
| 2021/0136039 A1 | 5/2021 | Jin et al. | |
| 2021/0273977 A1 | 9/2021 | Karasaridis et al. | |
| 2022/0078619 A1 | 3/2022 | Mahamkali | |
| 2022/0109701 A1 | 4/2022 | Zeng et al. | |
| 2022/0191248 A1 | 6/2022 | Pieczul et al. | |
| 2022/0286379 A1 | 9/2022 | Hofer et al. | |
| 2023/0042610 A1 | 2/2023 | Barton et al. | |
| 2023/0099259 A1 | 3/2023 | Kulaga et al. | |

OTHER PUBLICATIONS

Office Action for U.S. Appl. No. 18/776,556, filed Oct. 29, 2024.

\* cited by examiner

SYSTEM AND METHOD FOR FIREWALL POLICY RULE MANAGEMENT

RELATED APPLICATION DATA

The present invention is a continuation of prior U.S. application Ser. No. 18/344,274, filed Jun. 29, 2023, entitled "SYSTEM AND METHOD FOR FIREWALL POLICY RULE MANAGEMENT", which is incorporated herein by reference in its entirety.

FIELD OF THE INVENTION

The present invention relates generally to firewall policy and rule management; for example to a scalable firewall policy and rule management solution.

BACKGROUND OF THE INVENTION

Computer systems and technologies exist to provide network segregation, e.g., in an enterprise according to security, business or other requirements. In an environment or enterprise with tens or hundreds of thousands of computer hosts, such a network segregation requirement could result in millions of different network firewall policies or rules to manage. Each host may be, e.g. an end user computer (e.g. a desktop or laptop computer used by an enterprise employee), or servers, firewalls, or other computers operated by the enterprise. Each of these hosts may use hundreds or thousands of rules or policies, each rule or policy allowing, on a packet basis, connection (e.g. computer data exchange, communication or connection) to one other host: the default for hosts in such systems may be no connection is allowed to another specific host unless a specific rule allows for it. Each host may include an individually designed combination of rules or policies, each allowing for a connection from the host to another host; a single host may need to install a huge amount of network rules or policies.

SUMMARY OF THE INVENTION

A system and method may update network policies by determining, among a set of hosts, a subset of hosts to have network policies updated; for each host in the subset of hosts, determining a set of policies relevant to the host; and for each of the subset of hosts, installing the set of policies relevant to the host. The subset of hosts may be determined based on a category or division such as the time zone corresponding to the location of each host in the subset of hosts. The policies relevant to the host may be received from a database and saved to a file with the set of policies relevant to the host; the host may then access the file.

BRIEF DESCRIPTION OF THE DRAWINGS

Non-limiting examples of embodiments of the disclosure are described below with reference to figures listed below. The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings.

Figure 1:
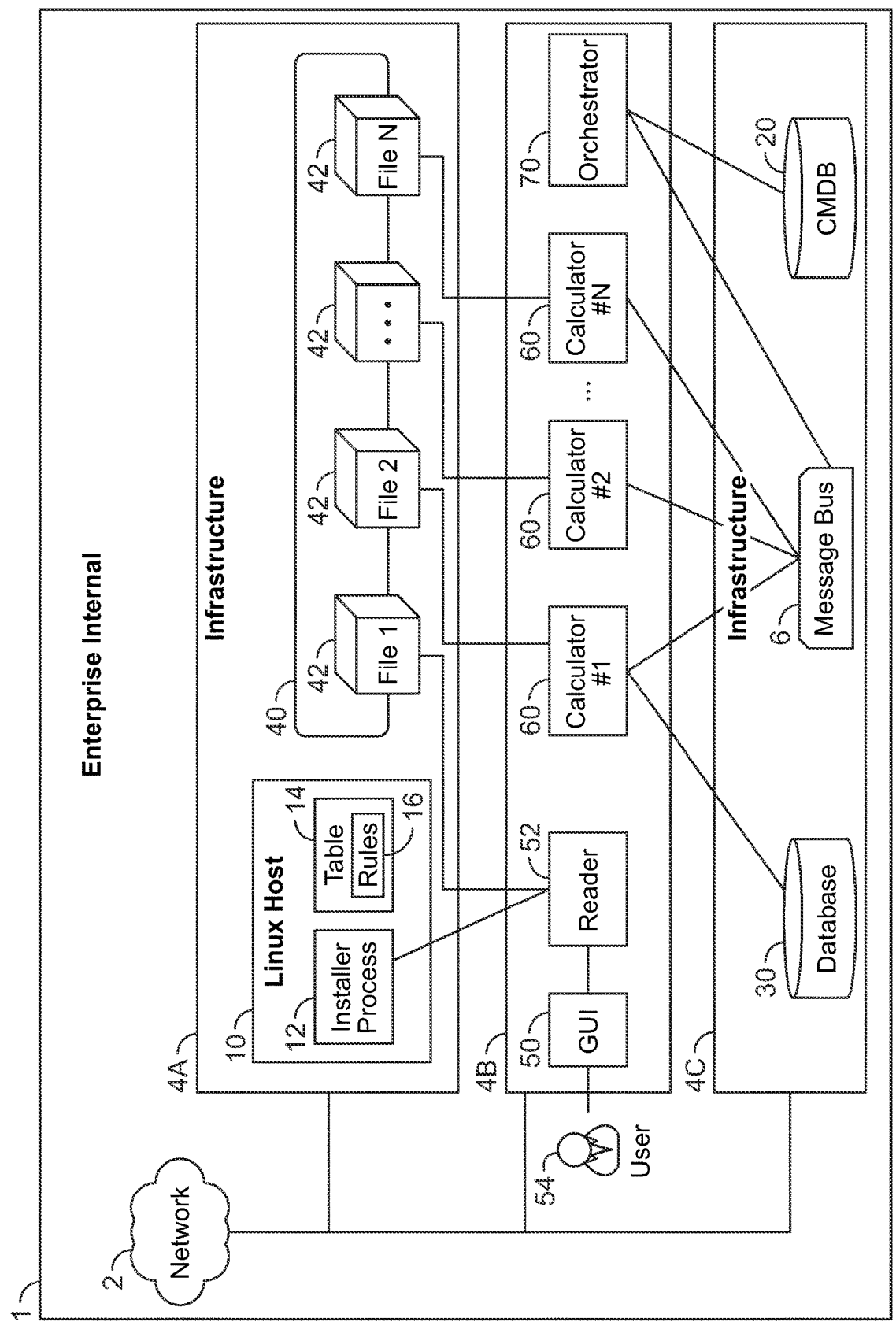
FIG. 1 depicts a policy management system for a number of hosts in an enterprise, according to embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments may divide, by time and by processing unit, the process of distributing network rules or policies from a central database to a large number of hosts (e.g. user computers, network devices, etc.) in an organization. One or more processes may determine, among the organization hosts, a subset to have network policies updated (e.g., a subset may be all hosts in a certain time zone, or another category of hosts), and for each of these selected hosts, may determine policies relevant to each of the subset and store these policies, e.g. in a file, e.g. one file per host. Each host may then access its file and use the rules or policies in the file to update its network policies. In some embodiments, different processes or computers may perform the different tasks, improving such technology and resulting in scalability and the ability to perform this large task in parallel: e.g. a first process or device may determine the subset; one or a set of processes may access the policies for each host from a database and save to files; and another process may access the files on behalf of the host. In different embodiments the tasks need not be divided as in the examples provided herein.

FIG. 1 depicts a policy management system for a number of hosts in an enterprise, according to embodiments of the present invention. Referring to FIG. 1, an enterprise 1 may include a number of hosts 10 (only one is shown for clarity), e.g. a server, firewall, user computer may include an installer agent or process 12 and a table 14. e.g. an IPTable storing policies or rules 16, e.g. Linux or other policies. Rules 16 may be used by firewall enforcement software to enforce a firewall relevant to the host on which they are installed. While one host 10 is shown for clarity, many hosts, e.g. many thousands, may be associated with or part of an organization or company. Installer process 12 may be an agent executing on host 10 with sufficient privilege (e.g., install privilege) to install or update policies or rules into table 14 when required (which may cause installation of policies to the associate host). An enterprise or other organization may include many, e.g. tens or hundreds of thousands, of hosts. CMDB (configuration management database) 20 may store information about hardware and software assets (commonly referred to as configuration items) including information describing hosts 10. For example, CMDB 20 may store, for each of hosts 10 (e.g. the hosts in an enterprise), information such as hostname and location. Database 30 may store user-defined-network-policies, including rules and policies. Rules and policies in database 30 may be indexed to or associated with, in database 30, hostnames, each hostname associated with a host 10. One or more calculator services or processes 60 may access database 30 to determine a set of policies relevant to or associated with a specific host, receive or extract policies or rules relevant to that host and create a network policy file 42 (or other suitable data object) storing those policies. Calculator services 60 may be distributed geographically across enterprise infrastructure, but may be centrally located. Calculator services 60 typically work closely with database 30; if database 30 has a replica in a region then calculator service may be geographically distributed to that region. Each file 42 may be compressed. Orchestrator 70 may identify or determine which hosts, e.g. a subset of hosts from the set of hosts associated with an enterprise or organization, are to have network policies or rules updated at a specific time or time period (e.g., based on the time zone of the hosts, or another characteristic of the hosts). Shared file system 40 may include sufficient space to store files 42. Each file 42 may be a temporary file created by a calculator process 60, as described herein, storing policies extracted from database 30 and relevant to a specific host 10. Shared file system 40 may be shared among entities such as calculator services 60 and reader service 52, and other entities such as some system administrators. Reader service 52 and other entities such as system administrator may have read-only access to each file 42.

In some embodiments, a file 42 created for a host persists for a certain fixed amount of time (e.g. 24 hours), and then is deleted, and not reused for another host; however, different embodiments may use other methods of using such files. For example, a calculator service may perform calculations at 1:00 AM local time for a host, and an installer agent may install at 2:00 AM local time. In such a system, the host file may be refreshed every 24 hours.

A reader service or process 52 may be used by agent or process 12 to fetch or access the network policy file associated with the host executing agent 12, e.g. from the shared file system. In FIG. 1 one host 10 is shown using reader service 52 to access one file 42; in practice many hosts may each use a reader service to access a network policy file 42 concurrently.

Hosts as used herein may be computers (e.g. desktops, servers, laptops, smartphones, etc.) and may be Linux hosts, e.g. operating the Linux system; however, systems other than Linux may be used.

While data flow or connections in FIG. 1 are indicated by lines with arrows, in general the various entities in FIG. 1 such as hosts 10 and reader service or process 52 may communicate and exchange data via networks 2, such as intranets (in some embodiments networks 2 do not include the Internet, as communications are typically internal to an organization; however in other embodiments the Internet may be used). Further, entities in FIG. 1 may exchange data on message bus 6, for instance, the Apache Kafka event store and stream processing platform; message bus 6 may make use of networks 2. For example, message bus 6 may be used to communicate identities of a subset of hosts to have network policies updated.

One or more servers such as servers 4A (e.g. hosting a shared file system), 4B (e.g. hosting calculator and orchestrator processes) and 4C (e.g. hosting databases and a message bus) may host and execute processes such as shared file systems, calculators, orchestrators, databases, etc. While specific elements of FIG. 1 are hosted by specific servers, in other embodiments, such elements may be hosted by other servers, in cloud based systems, etc.

Each host 10 may be configured such that communication with another host or computer is not permitted unless a specific rule of rules 16 permits communication, e.g. an exchange of packets, with a specific host or computer. Table 14 may be a table or other data structure (or multiple tables or data structures), accessed by a user-space utility program that allows a user or system administrator to configure rules 16 such as IP packet filter rules for the host, e.g. the rules of a Linux kernel firewall for the host, but may be another type of rule storage structure, and need not use the Linux environment. Rules 16 may be in one or more tables 14, and may tell the host's system how to treat network traffic packets. A host may include many, e.g. thousands of, rules 16. Each of rules 16 may enable connection to another host, or provide another function, and may take the form of, for example -A OUTPUT -p tcp -d 1.2.3.4/23 -j ACCEPT. Other rule formats may be used.

Installer process 12 may be subject to restrictions such as it is only allowed to execute at certain times (e.g., at 2:00 AM local time for its associated host) so that it has least impact on user's daily work.

A user 54 may use GUI (graphical user interface) 50 to access reader process 52 to review rules or policies assigned to a host. The user may enter the specified hostname into GUI 50 which may contact reader service or process 52 to fetch the corresponding file from the shared file system.

Figure 3:
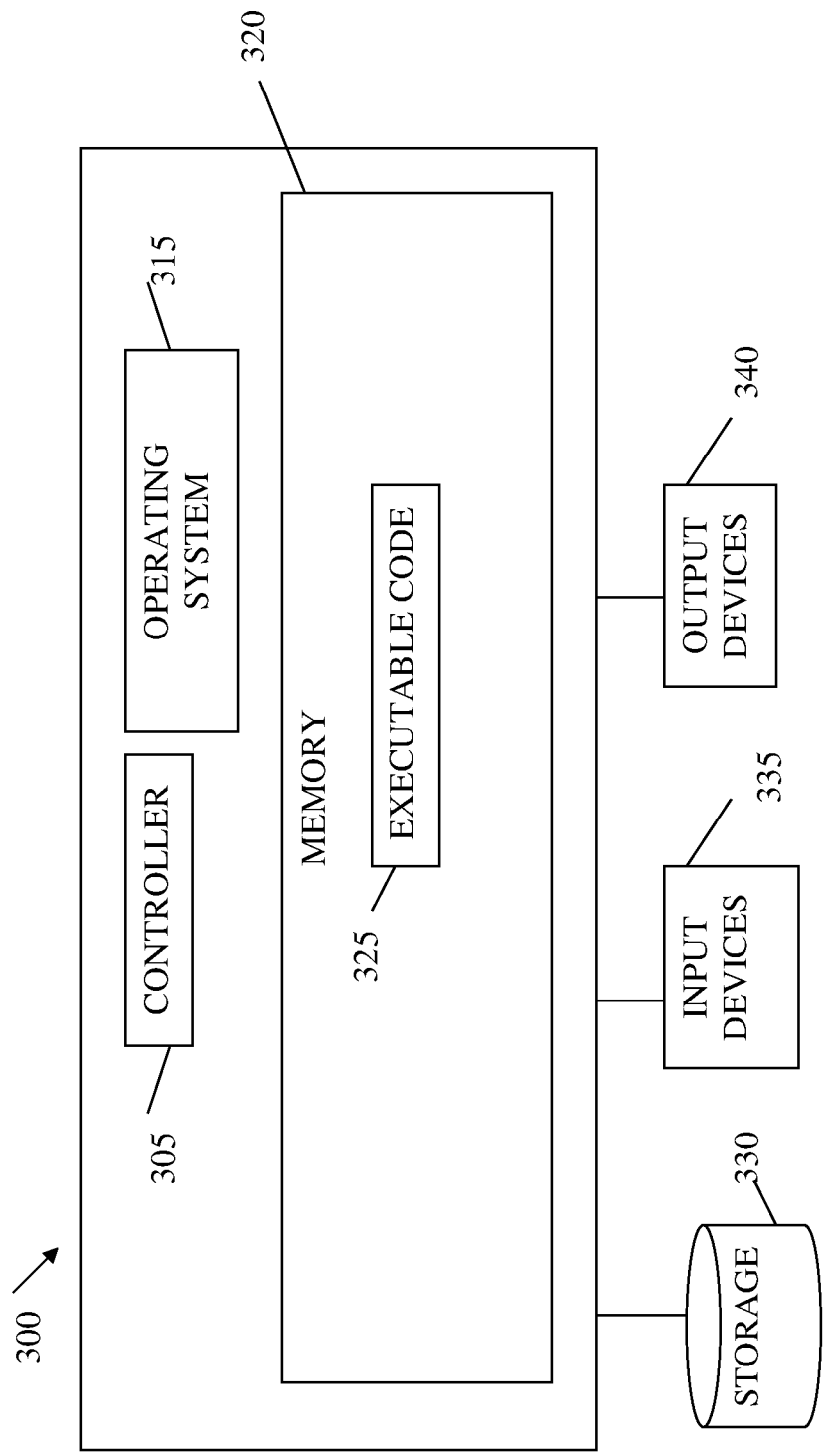
FIG. 3 shows a high-level block diagram of an exemplary computing device according to some embodiments of the present invention.

The system depicted in FIG. 1 may include multiple processors, as each of computers and modules such as servers 4A, 4B, and 4C, hosts 10, installer agent or process 12, calculator services or processes 60, orchestrator 70, and other modules may be, or include, components such as in FIG. 3. Thus, in practice, among a number of processors (typically each associated with a memory), a processor among the processors may determine a subset of hosts to update; another processor (possibly the same processor as the first in some embodiments) among the plurality of processors may determine a set of policies relevant to hosts;

and another processor (possibly the same processor as the first and/or second in some embodiments) may install a set of policies relevant to a host.

Embodiments may improve the technologies of policy and firewall management by allowing for transparency and scalability of firewall management in large organizations. In a small organization with few hosts to manage, a server and database may provide policies for deployment to hosts. In large scale host management this does not work as well, as each of thousands of hosts may have thousands of policies individually specified for that host, meaning tens of millions of policies may need to be distributed to tens of thousands of hosts. Each policy may control or allow access between the host on which it is installed (in some cases the default is that absent a policy, the host cannot connect to another host), and possibly one other host; thus in such a system each host may need many policies. Embodiments may improve the distribution of such policies, by precomputing or pre-filtering network policies relevant to a host, and providing the pre-filtered policies in a file or shared folder, to be fetched by the destination host. By placing relevant policies in a file, and through the use of a shared file system, embodiments may provide transparency, allowing a user to easily see the relevant policies for auditing, troubleshooting, or other purposes. Prior art systems keep such policies in a database, which is more difficult to access and less scalable. As the total number of hosts grows, the tools to update policies (e.g. calculator services or processes 60) may grow with them, providing scalability. This is especially important when hosts are distributed geographically. Embodiments may solve scalability problems by splitting computational targets, e.g. of which hosts get which policies, and database access, from all-at-once across a global system of hosts, to smaller regional needs (e.g. dividing by time zone) and making use of asynchronous communication (e.g. such that policies are fetched from a database, stored in a file, then accessed by a host). In one embodiment, all firewall policy computations for a region may be completed within one hour.

Figure 2:
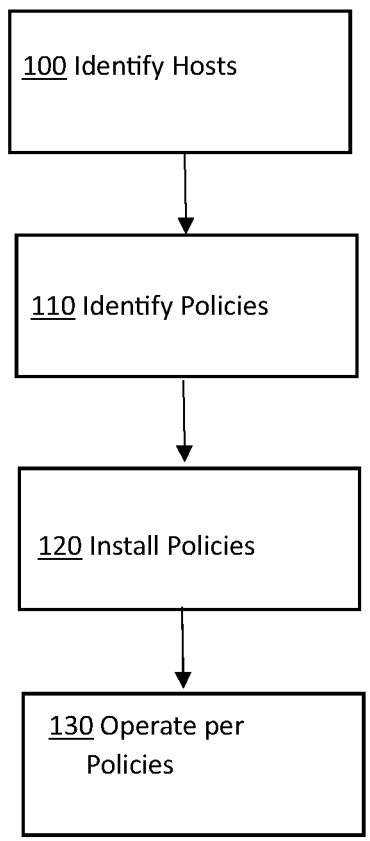
FIG. 2 shows a flowchart of a method according to embodiments of the present invention.

FIG. 2 shows a flowchart of a method according to embodiments of the present invention. The operations of FIG. 2 may be performed by the systems shown in FIG. 1 and FIG. 3, but other systems may be used.

Referring to FIG. 2, in operation 100, a process may identify or determine a subset of hosts or computing devices, from a larger set of hosts (e.g. all hosts in an organization) to have network policies updated or distributed to, from a set of hosts. For example, an orchestrator service such as orchestrator 70 may execute or be triggered, for example periodically, such as an hourly basis. When executed, an orchestrator service may, for example, fetch Linux or other host information from a data store such as CMDB 20, and filter or select those hosts which fit a certain criteria, or receive an appropriately filtered list from a data store. For example, the subset of hosts may be determined based on the time zone corresponding to the location of each host in the subset of hosts: hosts that are, per the data store, located or physically present at a certain local time (e.g. local time 1:00 AM) may be selected. For example, all Linux hosts within region Singapore and Hong Kong may be selected as part of one subset, as these locations are in time zone GMT+8. The selected subset of hosts (e.g., the identities or identifiers identifying these hosts) may be then transmitted to other processes; for example an orchestrator service may publish the selected Linux hostnames onto message bus 6. In such an example, where all hosts within an organization that reside within a certain time zone are updated at approximately the same time, e.g. at local time 1:00 AM, it may create a natural division by hour to reduce the computer infrastructure burden on accessing update data and updating hosts. While time zones are used as an example method of categorizing or dividing hosts into groups or subsets for updating, in other embodiments other methods may be used. In one embodiment, an orchestrator service automatically starts execution periodically, e.g. every hour, and fetches all hosts identifications from a database such as CMDB 20, then filters and selects hosts in a certain category (e.g. located where local time is 1:00 AM, based on host location information); then publishes the filtered or selected hostnames, e.g. onto a message bus one by one. An orchestrator process may include a list of locations correlated with locations, and use the time of its execution to determine which location to use to filter or select hosts; e.g. an orchestrator may correlate GMT+8 with Singapore and Hong Kong. A sample message published by an orchestrator is {'hostname': 'abc'}, where abc is an enterprise Linux hostname, and each message represents one host. Other methods of transmitting selected hosts to other processes may be used.

In operation 110, for each host in the subset of hosts or computing devices, a process may determine or identify a set of policies or rules relevant to or associated with that host. For example, a calculator service or process 60 may access and consume an individual hostname produced in operation 100 from a message bus, match or correlate the hostname to entries for network policies from a database storing network policies, e.g. by querying database 30 with a hostname, and receive from the database policies or rules relevant to the host. Multiple calculator services or processes 60, each servicing one host at a time, may exist and operate substantially concurrently, but these processes may be reused for multiple hosts, after each host is serviced. Calculator processes or services may operate by periodically consuming messages from a message bus, e.g. each calculator process consuming one message every second, process it (e.g. identify policies relevant to a hostname) and move onto the next message. Thus in one embodiment calculator services are reused for different hosts. Other methods of determining policies relevant to a host may be used.

Each of a plurality of processes may operate substantially at the same time, at overlapping time periods, or concurrently to determine a set of policies relevant to the subset of hosts. Policies for multiple hosts may be determined concurrently, and multiple calculator services may operate concurrently. Thus, in one embodiment, all hosts located in one time zone, or one category, may have their policies determined at the same time or concurrently. Other methods of determining policies to apply to hosts may be used; e.g. a calculator service need not be used.

In one embodiment, a calculator service may communicate policies or rules to a host via a calculator service output. A calculator service may produce, or save the policies to, a file or other data object (e.g. file 42) with the set of policies relevant to the host, which may be a compressed file with computed network policies for a given host, where the file is stored on a shared file system, e.g. on a server such as server 4A or a cloud service. Other methods of transmitting identified policies to hosts may be used.

In operation 120, for each of the subset of hosts, the set of policies relevant to the host may be installed in that host. For example, at a certain standardized time, e.g. 2:00 AM local time to the host, an installer agent or process 12 executing on a host may wake up or be executed and access a file or other data store, e.g. the most recently created file, of rules or policies for the host on which it is executing. E.g., a host, using such an installer process, may contact reader service or process 52 (e.g. executing on a server or cloud system separate from a host) to access or fetch its own network policy file (e.g. associated with or relevant to its host) from a shared file system or another file system, to access policies relevant to the host. It may decompress the file and install accordingly to update policies, for example by replacing, updating or modifying a table such as table 14. The installer process may use, e.g. an iptables-save command to install the rules; other methods may be used. This may occur at a regular time, e.g. in coordination with or shortly after operations 100 and 110. For example, in one implementation, Singapore and Hong Kong servers (as hosts) start to fetch and install network policies at 2:00 AM local time. In some embodiments, a separate reader service need not be used to access a file of rules. In one embodiment, one reader service exists for an organization, servicing thousands of hosts, where the hosts contact the reader service by HTTP request.

A reader service may provide security, authentication, authorization and auditing, and prevent impersonation and information leaks. For example, a host agent calling a reader service may transmit IP address, hostname and a secret key to the reader, which may then verify this information. If verification is successful, the reader returns the correct firewall to that host; if unsuccessful, the reader does not return anything to the host, and may log a warning message and/or raise an alert for enterprise security team to follow up. If a human system administrator calls the reader, the reader may verify the person's identity and permissions, and only if verified does the reader return information re hosts the person can access. For example, in some embodiments a system administrator in department A cannot view firewall rules of hosts in department B.

In operation 130, hosts may operate according to policies. Each rule or policy may, when processed by a program such as the iptables utility, prevent or allow, on a packet basis or another basis, connection (e.g. computer data exchange, communication or connection) to one other host. In some embodiments, the default for hosts in such systems may be no connection is allowed to another specific host unless a specific rule allows for it.

Other operations or series of operations may be used.

While specific modules and servers are described herein as executing specific functions, in other embodiments, the functions described herein may be performed by different modules or hardware.

Reference is made to FIG. 3, showing a high-level block diagram of an exemplary computing device according to some embodiments of the present invention. Computing device 300 may include a controller 305 that may be, for example, a central processing unit processor (CPU) or any other suitable multi-purpose or specific processors or controllers, a chip or any suitable computing or computational device, an operating system 315, a memory 320, executable code 325, a storage system 330, input devices 335 and output devices 340. Controller 305 (or one or more controllers or processors, possibly across multiple units or devices) may be configured to carry out methods described herein, and/or to execute or act as the various modules, units, etc. for example when executing code 325. More than one computing device 300 may be included in, and one or more computing devices 300 may be, or act as the components of, a system according to embodiments of the invention. Various components, computers, and modules of FIG. 1 may be or include devices such as computing device 300, and one or more devices such as computing device 300 may carry out functions such as those described in FIG. 2.

Operating system 315 may be or may include any code segment (e.g., one similar to executable code 325) designed and/or configured to perform tasks involving coordination, scheduling, arbitration, controlling or otherwise managing operation of computing device 300, for example, scheduling execution of software programs or enabling software programs or other modules or units to communicate.

Memory 320 may be or may include, for example, a Random Access Memory (RAM), a read only memory (ROM), a Dynamic RAM (DRAM), a double data rate (DDR) memory chip, a Flash memory, a volatile memory, a non-volatile memory, a cache memory, or other suitable memory or storage units. Memory 320 may be or may include a plurality of, possibly different memory units. Memory 320 may be a computer or processor non-transitory readable medium, or a computer non-transitory storage medium, e.g., a RAM.

Executable code 325 may be any executable code, e.g., an application, a program, a process, task or script. Executable code 325 may be executed by controller 305 possibly under control of operating system 315. For example, executable code 325 may configure controller 305 to act as a calculator service, orchestrator, or other module, or to access, filter, distribute and/or install policies, and perform other methods as described herein. Although, for the sake of clarity, a single item of executable code 325 is shown in FIG. 3, a system according to some embodiments of the invention may include a plurality of executable code segments similar to executable code 325 that may be loaded into memory 320 or another non-transitory storage medium and cause controller 305, when executing code 325, to carry out methods described herein.

Storage system 330 may be or may include, for example, a hard disk drive, a CD-Recordable (CD-R) drive, a universal serial bus (USB) device or other suitable removable and/or fixed storage unit. Data such as policies may be stored in storage system 330 and may be loaded from storage system 330 into memory 320. Some of the components shown in FIG. 3 may be omitted. Although shown as a separate component, storage system 330 may be embedded or included in memory 320.

Input devices 335 may be or may include a mouse, a keyboard, a microphone, a touch screen or pad or any suitable input device. Any suitable number of input devices may be used as shown by block 335. Output devices 340 may include one or more displays or monitors, speakers and/or any other suitable output devices. Any suitable number of output devices may be used as shown by block 340. Any applicable input/output (I/O) devices may be connected to computing device 300 as shown by blocks 335 and 340. For example, a wired or wireless network interface card (NIC), a printer, a universal serial bus (USB) device or external hard drive may be included in input devices 335 and/or output devices 340.

In some embodiments, device 300 may include or may be, for example, a personal computer, a desktop computer, a laptop computer, a workstation, a server computer, a network device, or any other suitable computing device.

In the description and claims of the present application, each of the verbs, "comprise", "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Embodiments comprising different combinations of features noted in the described embodiments, will occur to a person having ordinary skill in the art. Some elements described with respect to one embodiment may be combined with features or elements described with respect to other embodiments. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A method for updating network policies, the method comprising:
   determining, from a set of hosts, a subset of hosts to have network policies updated;
   for each host in the subset of hosts, a calculator service among a plurality of calculator services determining a set of policies relevant to the host, the policies relevant to the host indexed with the hostname for the host;
   wherein determining a set of policies relevant to a host comprises:
      a calculator service from the plurality of calculator services receiving, from a database, a set of policies relevant to the host and producing a file with the set of policies relevant to the host, the calculator services operating at overlapping time periods, the plurality of calculator services producing a plurality of files; and
   for each of the subset of hosts, installing, using a process different from a calculator service, from the file with the set of policies relevant to the host, the set of policies relevant to the host.

2. The method of claim 1, wherein the subset of hosts is determined based on the time zone corresponding to the location of each host in the subset of hosts.

3. The method of claim 1, wherein the identities of the subset of hosts to have network policies updated are communicated, via a message bus, to a plurality of processes operating to determine a set of policies.

4. The method of claim 1, wherein each policy determines whether a host is prevented or allowed to connect to another host.

5. The method of claim 1, wherein each host accesses the file with the set of policies relevant to the host via a reader process.

6. A system for updating network policies, the system comprising:
   at least one memory; and
   a plurality of processors, wherein:
   at least one processor among the plurality of processors is configured to determine, from a set of hosts, a subset of hosts to have network policies updated;
   a calculator service, among a plurality of calculator services, and executed by at least one processor among the plurality of processors, is to determine a set of policies relevant to the host, the policies relevant to the host indexed with the hostname for the host;
   wherein determining a set of policies relevant to a host comprises:
      a calculator service from the plurality of calculator services receiving, from a database, a set of policies relevant to the host and producing a file with the set of policies relevant to the host, the calculator services operating at overlapping time periods, the plurality of calculator services producing a plurality of files; and
   at least one processor among the plurality of processors is configured to install, using a process different from a calculator service, from the file with the set of policies relevant to the host, a set of policies relevant to a host.

7. The system of claim 6, wherein the subset of hosts is determined based on the time zone corresponding to the location of each host in the subset of hosts.

8. The system of claim 6, wherein the identities of the subset of hosts to have network policies updated are communicated, via a message bus, to a plurality of processes operating to determine a set of policies.

9. The system of claim 6, wherein each policy determines whether a host is prevented or allowed to connect to another host.

10. A method for updating network policies, the method comprising:
    determining a subset of hosts to have network policies updated;
    for each host in the subset of hosts, a calculator service among a plurality of calculator services receiving from a database a set of policies relevant to the host, the policies relevant to the host indexed with the hostname for the host, the calculator service for each host in the subset of hosts storing in a file a set of policies relevant to the host, the calculator services operating at overlapping time periods, the plurality of calculator services producing a plurality of files; and
    for each of the subset of hosts, installing, using a process different from a calculator service, from the file with the set of policies relevant to the host, the set of policies relevant to the host.

11. The method of claim 10, wherein the subset of hosts is determined based on the time zone corresponding to the location of each host in the subset of hosts.

12. The method of claim 10, wherein the identities of the subset of hosts to have network policies updated are communicated, via a message bus, to a plurality of processes operating to determine a set of policies for each host in the subset.

13. The method of claim 10, wherein each policy determines whether a host is prevented or allowed to connect to another host.

* * * * *